(12) United States Patent
Qaraqe et al.

(10) Patent No.: US 12,500,002 B2
(45) Date of Patent: Dec. 16, 2025

(54) LONG TERM HbA1c PREDICTION

(71) Applicants: Qatar Foundation for Education, Science and Community Development, Doha (QA); SIDRA MEDICAL AND RESEARCH CENTER, Doha (QA)

(72) Inventors: Marwa K. Qaraqe, Doha (QA); Md Shafiqul Islam, Doha (QA); Samir Brahim Belhaouari, Doha (QA); Goran Petrovski, Doha (QA)

(73) Assignees: HAMAD BIN KHALIFA UNIVERSITY, Doha (QA); SIDRA MEDICAL AND RESEARCH CENTER, Doha (QA)

( * ) Notice: Subject to any disclaimer, the term of this patent is extended or adjusted under 35 U.S.C. 154(b) by 309 days.

(21) Appl. No.: 18/101,913

(22) Filed: Jan. 26, 2023

(65) Prior Publication Data
US 2023/0238147 A1 Jul. 27, 2023

Related U.S. Application Data

(60) Provisional application No. 63/303,291, filed on Jan. 26, 2022.

(51) Int. Cl.
*G16H 50/50* (2018.01)
*G16H 20/10* (2018.01)
*G16H 50/70* (2018.01)

(52) U.S. Cl.
CPC ............ *G16H 50/50* (2018.01); *G16H 20/10* (2018.01); *G16H 50/70* (2018.01)

(58) Field of Classification Search
USPC ........................................................ 382/156
See application file for complete search history.

(56) References Cited

U.S. PATENT DOCUMENTS

| | | | |
|---|---|---|---|
| 2017/0014495 A1 * | 1/2017 | Sarangarajan | A61K 47/595 |
| 2020/0164209 A1 * | 5/2020 | Hogg | A61N 1/0496 |
| 2024/0242834 A1 * | 7/2024 | Deng | A61B 5/4839 |

FOREIGN PATENT DOCUMENTS

EP 3477589 A1 * 5/2019 ........... A61B 5/7267

OTHER PUBLICATIONS

Wong, et al.; "The Corresslation between Hemoglobin A1c (HbA1c) and Hyperreflective Dots (HRD) in Diabetic Patients"; International Journal of Environmental Research and Public Health; May 1, 2020; (11 pages).
Lopez, et al.; "Retinal Image Analysis to Detect and Quantify Lesions Associated With Diabetic Retinopathy"; Investigative Ophthalmology & Visual Science; vol. 44, 3977; May 2003; (2 pages).
Salz, et al; "Imaging in Diabetic Retinopathy"; Middle East African Journal of Ophthalmology; Apr. 2015; (13 pages).

* cited by examiner

*Primary Examiner* — Jacky X Zheng
(74) *Attorney, Agent, or Firm* — K&L Gates LLP

(57) ABSTRACT

Provided are methods of predicting HbA1c values.

15 Claims, 20 Drawing Sheets

Relative risk of diabetes complexities and HbA1c test ranges. Source: adapted from [3]

Fig. 1 Relative risk of diabetes complexities and HbA1c test ranges, Source: adapted from [3]

| Day | 12:00AM | 00:30AM | 00:45AM | 01:00AM |
|---|---|---|---|---|
| 1 | 74 | 71 | 68 | 74 |
| 2 | 149.5 | 172 | 166 | 162 |
| 3 | 141.5 | 140 | 137 | 138 |
| 4 | 290 | m1 | 289 | 286 |
| 5 | 217 | 200 | 198 | 199 |
| 6 | 60 | 82 | 90 | 93 |
| 7 | 136 | 156 | 157 | 158 |
| 8 | 104 | 122 | m2 | 135 |
| 9 | 173 | 163 | 169 | 172 |
| 10 | 228 | 213 | 199 | 178 |
| 11 | 194 | 191 | 201.5 | 197 |

| N1 | N2 | N3 | N4 | N5 | N6 | N7 | N8 | Missing |
|---|---|---|---|---|---|---|---|---|
| 141.5 | 140 | 137 | 290 | 289 | 217 | 200 | 198 | m1 |
| 155 | 157 | 158 | 122 | 135 | 163 | 169 | 172 | m2 |

Fig. 3: The estimation of missing CGM data points using rectangular nearest neighbours method Fig. 4: The estimation of missing CGM data points using circular nearest neighbours method Fig. 5 Model architecture for few-shot learning-based feature extraction and fusion for HbA1c prediction Fig. 6  The conversion of CGM sensor data to binary image illustration.

Fig. 7  The conversion of CGM sensor data to histogram image illustration.

Fig. 9: The proposed k-nearest neighbor approach of test image classification

Fig. 10: The comparison of binary images among four classes- C1, C2, C3, and C4

Fig. 11: The comparison of histogram images among four classes- C1, C2, C3, and C4

Fig. 13: The ten classes of CIFAR10 dataset. Source: adapted from [24].

Table I: CGM Data Collection Summary

| Total Subjects | Mean Age ± SD (years) | Number of Days | CGM Device | Samples Per Day | HbA1c Range (%) |
|---|---|---|---|---|---|
| 200 | 12.7 ± 4.5 | 90 | Free Style Libre | 96 | 5.2-14.5 |

FIG. 14A

Table II: Split of 200 Patients into Four (C1-C4) Classes based on their HbA1c Control Levels

| Class | Category/Level | HbA1c Range (%) | Total Subjects |
|---|---|---|---|
| C1 | Good Control | HbA1c ≤ 7.5 | 58 |
| C2 | Medium Control | 7.5 < HbA1c ≤ 9 | 56 |
| C3 | Poor Control | 9 < HbA1c ≤ 7.5 | 51 |
| C4 | Uncontrolled | HbA1c > 12.5 | 35 |

FIG. 14B

Table III: Split of 200 Patients into Six (S1-S6) Classes based on their HbA1c Control Levels

| Class | Category/Level | HbA1c Range (%) | Total Subjects |
|---|---|---|---|
| S1 | Normal | HbA1c ≤ 6.5 | 31 |
| S2 | Good | 6.5 < HbA1c ≤ 7.5 | 27 |
| S3 | Average | 7.5 < HbA1c ≤ 8.25 | 31 |
| S4 | Medium | 8.25 < HbA1c ≤ 9 | 25 |
| S5 | Poor | 9 < HbA1c ≤ 10.5 | 41 |
| S6 | Uncontrolled | HbA1c > 10.5 | 45 |

FIG. 14C

Table IV: The Data Augmentation for Four Classes

| Data Combinations | Label |
|---|---|
| FSL Distance (C1 vs. C1) | 0 |
| FSL Distance (C2 vs. C2) | 0 |
| FSL Distance (C3 vs. C3) | 0 |
| FSL Distance (C4 vs. C4) | 1 |
| FSL Distance (C1 vs. C2, C3, C4) | 1 |
| FSL Distance (C1 vs. C1, C3, C4) | 1 |
| FSL Distance (C1 vs. C1, C2, C4) | 1 |
| FSL Distance (C4 vs. C1, C2, C3) | 1 |

FIG. 14D

Table V: The Data Augmentation for Six Classes

| Data Combinations | Label |
|---|---|
| FSL Distance (S1 vs. S1) | 0 |
| FSL Distance (S3 vs. S3) | 0 |
| FSL Distance (S5 vs. S5) | 0 |
| FSL Distance (S7 vs. S7) | 0 |
| FSL Distance (S9 vs. S9) | 0 |
| FSL Distance (S10 vs. S10) | 0 |
| FSL Distance (S1 vs. S3, S5, S7, S9, S10) | 1 |
| FSL Distance (S3 vs. S1, S5, S7, S9, S10) | 1 |
| FSL Distance (S5 vs. S1, S3, S7, S9, S10) | 1 |
| FSL Distance (S7 vs. S1, S3, S5, S9, S10) | 1 |
| FSL Distance (S9 vs. S1, S3, S5, S7, S10) | 1 |
| FSL Distance (S10 vs. S1, S3, S5, S7, S9) | 1 |

FIG. 14E

Table VI: The Four-Class Separation Results for a Binary, Histogram, and Statistical Features

| Feature | Train Accuracy | Test Accuracy |
|---|---|---|
| Binary | 91.40% | 87.56% |
| Histogram | 88% | 86.25% |
| Statistical | 87.30% | 85.50% |
| Concatenation | 92.59% | 90.26% |

FIG. 14F

Table VII: The Six-Class Separation Results for a Binary, Histogram, and Statistical Features

| Feature | Train Accuracy | Test Accuracy |
|---|---|---|
| Binary | 85.22% | 84.75% |
| Histogram | 83% | 81.40% |
| Statistical | 85% | 82.23% |
| Concatenation | 86.70% | 85.51% |

FIG. 14G

Table VIII: The Data Augmentation Classification Results for Four Classes

| Classification | Train Accuracy | Test Accuracy |
|---|---|---|
| (C1 vs. C2, C3, C4) | 94.52% | 90.75% |
| (C1 vs. C1, C3, C4) | 93.25% | 89.37% |
| (C1 vs. C1, C2, C4) | 92.45% | 90.7% |
| (C4 vs. C1, C2, C3) | 90.14% | 90.22% |
| Overall | 96.35% | 92.30% |

FIG. 14H

Table IX: The Data Augmentation Classification Results for Six Classes

| Task | Train Accuracy | Test Accuracy |
|---|---|---|
| (S1 vs. S2, S3, S4, S5, S6) | 87.6% | 85.22% |
| (S2 vs. S1, S3, S4, S5, S6) | 86.83% | 88.71% |
| (S3 vs. S1, S2, S4, S5, S6) | 92.14% | 89.47% |
| (S4 vs. S1, S2, S3, S5, S6) | 80% | 82.34% |
| (S5 vs. S1, S2, S3, S4, S6) | 85% | 84.23% |
| (S6 vs. S1, S2, S3, S4, S5) | 80% | 79% |
| Overall | 90.12% | 87.73% |

FIG. 14I

Table X: Comparison of Literature on HbA1c Estimation

| Study | Data, Model | Feature | Prediction Category | $R^2$ |
|---|---|---|---|---|
| [10] | SMBG, DCCT 1441 instances | $\mu_{PG}$ | Current Estimation | 0.82 |
| [11] | SMBG, ADAG 507 instances | $\mu_{PG}$ | Current Estimation | 0.84 |
| [12] | SMBG, TIR 1137 instances | $\mu_{PG}$ | Current Estimation | 0.71 |
| [13] | SMBG, DNN 1543 instances | - | Current Estimation | 0.71 |
| [23] | CGM, 150 Subjects 2225 instances | FD, TIR, GV, WD, PSD | Advanced Prediction 2-3 Months | Accuracy 88.65% |
| Ours | SMBG, DCCT 1441 instances | Binary, Histogram Images | Advanced Prediction 2-3 Months | Accuracy 93.20% |

FIG. 14J

Table XI: The Evaluation of the Proposed FSL-based Model on the Publicly Available CIFAR10 Dataset

| Classification Task | Train Accuracy | Test Accuracy |
|---|---|---|
| Airplane vs. rest | 96.5% | 94.89% |
| Automobile vs. rest | 97.41% | 92.75% |
| Bird vs. rest | 95.55% | 94.10% |
| Cat vs. rest | 95.12% | 93% |
| Deer vs. rest | 93.95% | 90.43% |
| Dog vs. rest | 95.67% | 94.35% |
| Frog vs. rest | 96.75% | 93.88% |
| Horse vs. rest | 92.32% | 91.90% |
| Ship vs. rest | 95.67% | 93.11% |
| Truck vs. rest | 96.15% | 93.54% |
| Overall | 95.91% | 93.20% |

FIG. 14K

Table XII: The Comparison of the Proposed FSLD-based Model with the Literature

| Study | Method | Journal/Author/University | Test Accuracy |
|---|---|---|---|
| [25] | PCANet: A simple DL baseline | IEEE Transactions | 78.7% |
| [26] | Bayesian optimization of ML | University of Toronto, Harvard University | 9.35% |
| [27] | ReNet: Recurrent Neural Network | Yoshua Bengio | 87.7% |
| [28] | VCG-19 | University of Maryland | 94.71% |
| Ours | Few-shot Learning image distance feature extraction | | 93.20% |

FIG. 14L

Table XIII: The Comparison of the Proposed FSLD-based Model with the Literature

| Study | Data, Model | Feature | Prediction Category | Result | |
|---|---|---|---|---|---|
| | | | | MAE | $R^2$ |
| [61] | SMBG, DCCT 1441 instances | $\mu_{PG}$ | Current Estimation | - | 0.82 |
| [62] | SMBG, ADAG 507 instances | $\mu_{PG}$ | Current Estimation | - | 0.84 |
| [63] | SMBG, TIR 1137 instances | $\mu_{PG}$ | Current Estimation | - | 0.71 |
| [64] | SMBG, DNN 1543 instances | - | Current Estimation | 4.80 | 0.71 |

FIG. 14M

LONG TERM HbA1c PREDICTION

CROSS REFERENCE TO RELATED APPLICATION

The present application claims priority to U.S. Provisional Patent Application No. 63/303,291, filed Jan. 26, 2022, which is incorporated by reference herein in its entirety.

TECHNICAL FIELD

This disclosure relates to methods for predicting HbA1c values.

BACKGROUND

Diabetes mellitus (DM), commonly known as diabetes, is a chronic metabolic disorder which has been growing at an alarming rate throughout the world. One of the significant biomarkers used for DM diagnosis and management is glycated hemoglobin (HbA1c). HbA1c measures the concentration of glucose molecules that are bonded with the hemoglobin cell, and as hemoglobin cells typical live for 90-120 days, this measurement provides an estimation of average glucose concentrations for the previous 90-120 days. The proper management of diabetes significantly depends on the periodic assessment of HbA1c levels, and thus this test is often performed to classify diabetes severity (as shown in FIG. 1) and to forecast upcoming complexities. The ADA defines a test value of HbA1c<5.7% as non-diabetic. Test values between 5.7% and 6.4% are regarded as pre-diabetes states, while an HbA1c value≥6.5% is considered diabetic.

Regular monitoring of HbA1c levels is important for the proper management of diabetes. Lower-levels of HbA1c play an essential role in reducing or delaying microvascular difficulties that arise from diabetes. However, there is an association between elevated HbA1c levels and the development of diabetes-related comorbidities. Several studies concluded that HbA1c levels could be used to infer the future progression of diseases such as cardiovascular disease (CVD), as well as nerve, eye, and kidney damage. For example, a study among the East Asian patients found that high values of HbA1c increase the likelihood of mortality death from CVD. Another study correlated HbA1c with mortality and found a resilient connection between elevated HbA1c and mortality among the subjects without a previously known history of diabetes. Diabetic retinopathy is another health complication that arises from diabetes and affects the eyes. Researchers investigated the association between HbA1c and retinopathy and found that a 10% reduction of HbA1c reduces 43% of retinopathy development risk.

In the past, researchers only attempted to estimate the current value of HbA1c from plasma glucose values as outlined in Table 13 shown in FIG. 14M. In a clinical study of the Diabetes Control and Complications Trial (DCCT), a correlation was found between HbA1c and mean blood glucose, JBG. Estimated HbA1c values were compared with the actual HbA1c values and a coefficient of determination ($R^2$) score of 0.82 was obtained. Another similar study known as the A1c Derived Average Glucose (ADAG) also estimated the HbA1c values from the UBG. An $R^2$ score of 0.84 was found in the ADAG study. The authors investigated the relationship between HbA1c and UBG by using Pearson correlation and reported an $R^2$ score of 0.71. A deep neural network was recently applied to provide an instantaneous estimate HbA1c among T1DM patients. The approach used self-monitoring blood glucose (SMBG) measurements to estimate HbA1c and achieved an $R^2$ score of 0.71.

The prediction of HbA1c is a novel concept that allows patients and physicians to predict the HbA1c given their short term, past continuous blood glucose (CGM) measurements. This predictions shifts the management regime from reactive to a proactive approach, and provide a window for corrective action when elevated levels of HbA1c are predicted. In one of our previous studies, the ensembling of RF and extreme gradient boosting (XGB) coupled with time range, and glucose variability features fusion achieved an $R^2$ score of 0.81. Later, we implemented a multi-stage multi-class (MSMC) model comprised of SVM, NB, and RF for advanced prediction of HbA1c levels into four distinct classes and obtained an accuracy of 88.65%.

SUMMARY

Disclosed embodiments comprise the conversion of time series blood glucose data into binary and histogram images for means of HbA1c prediction, and the development of the prediction model.

In embodiments, these images are then fed to a convolutional neural network (CNN) based few-shot learning (FSL) model for feature extraction. A CNN is a Deep Learning algorithm that can take in an input image, assign importance (learnable weights and biases) to various aspects/objects in the image, and be able to differentiate one from the other. The pre-processing required in a CNN is much lower as compared to other classification algorithms. While in primitive methods filters are hand-engineered, with enough training, CNNs have the ability to learn these filters/characteristics.

The architecture of a CNN is analogous to that of the connectivity pattern of neurons in the human brain and was inspired by the organization of the Visual Cortex. Individual neurons respond to stimuli only in a restricted region of the visual field known as the Receptive Field. A collection of such fields overlap to cover the entire visual area.

In embodiments, a novel normalized FSL-distance (FSLD) metric is proposed for accurately separating the images of different HbA1c levels. In embodiments, a k-nearest neighbor (KNN) model with majority voting is implemented for advanced HbA1c level prediction.

In disclosed embodiments, the FSLD feature extraction and KNN-based image classification architecture show an accuracy of 92.30% for advanced prediction of HbA1c levels. For the first time in the literature or in medical practice, advanced HbA1c prediction is achieved.

Disclosed embodiments comprise methods for diagnosing and evaluating diabetes progression.

Disclosed embodiments comprise treatment and management of conditions including diabetes and cardiovascular disease.

BRIEF DESCRIPTION OF THE DRAWINGS

FIG. 13 shows the ten classes of CIFAR10 dataset.

FIGS. 14A-14M illustrate tables 1-13 of data referenced throughout the present disclosure.

DETAILED DESCRIPTION

Figure 1:
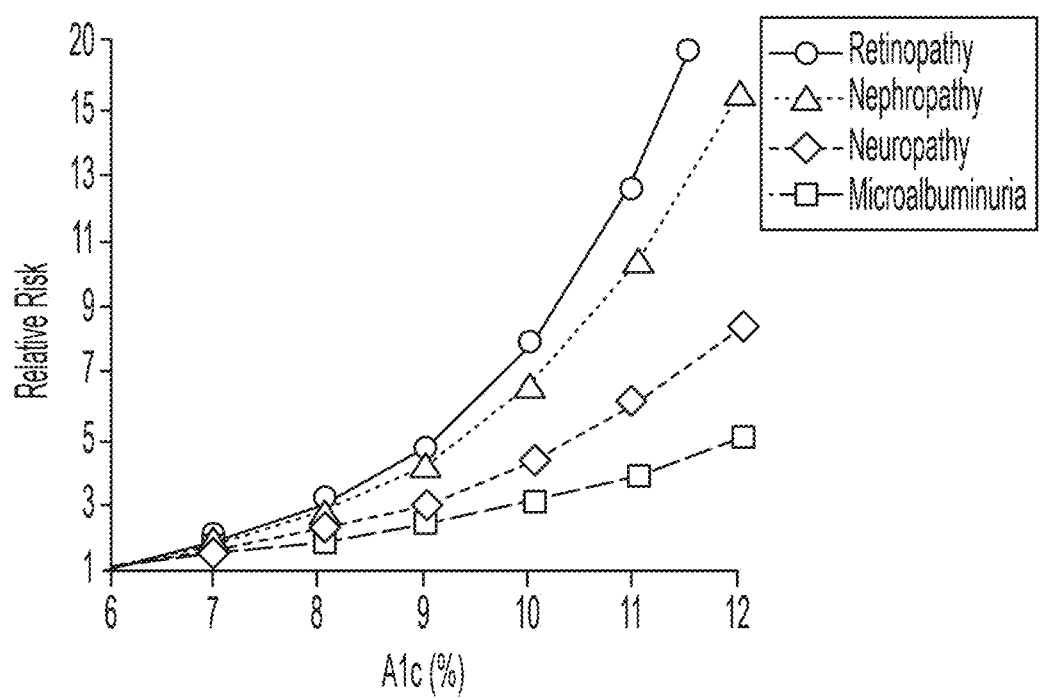
FIG. 1 shows relative risk of diabetes complexities and HbA1c test ranges.

The disclosed methods for prediction of HbA1c given current BG trends transforms the current management of diabetics from a reactive to a proactive approach; allowing patients and physicians to make changes to treatment plans, lifestyle, and foods to avoid elevated HbA1c levels in the future. Despite the critical significance of predicting HbA1c levels, few works have investigated this idea. However, recent advancements in sensor technology facilitate the daily monitoring of BG levels using CGM devices. These devices provide large sets of data that can be exploited to gain insight into diabetes, including the prediction of HbA1c.

Disclosed embodiments comprise the conversion of time series continuous glucose monitoring (CGM) sensor data into binary and histogram images as means for HbA1c prediction. In embodiments, these images are then fed to the convolutional neural network (CNN) adapted from the few-shot learning (FSL) model for feature extraction. A novel normalized FSL-distance (FSLD) metric is proposed for accurately separating the images of different HbA1c levels. Finally, a k-nearest neighbor (KNN) model with majority voting can be implemented for advanced HbA1c level prediction. The proposed FSLD feature extraction and KNN-based image classification architecture show an accuracy of 92.30% for advanced prediction of HbA1c levels. For the first time in the literature or in medical practice, advanced HbA1c prediction is achieved.

Subjects suitable for the disclosed methods and treatments can comprise, for example, mammals, such as humans or animals.

Definitions

"A" and "an" are used herein to refer to one or to more than one (i.e., to at least one) of the grammatical object of the article. By way of example, "an element" means one element or more than one element.

"Comprise," "comprising," "include," "including," "have," and "having" are used in the inclusive, open sense, meaning that additional elements may be included. The terms "such as", "e.g.", as used herein are non-limiting and are for illustrative purposes only. "Including" and "including but not limited to" are used interchangeably.

"Or" as used herein should be understood to mean "and/or", unless the context clearly indicates otherwise.

"Patient," "subject," or "host" to be treated by the subject methods can mean either a human or non-human animal.

"Pharmaceutically acceptable carrier, diluent, or excipient" is a medium generally accepted in the art for the delivery of biologically active agents to mammals, e.g., humans. The compositions of the present disclosure can be formulated as pharmaceutical compositions or formulations using a pharmaceutically acceptable carrier, diluent, or excipient and administered by a variety of routes. In particular embodiments, such compositions are for oral or intravenous administration. Such pharmaceutical compositions and processes for preparing them are well known in the art. See, e.g., REMINGTON: THE SCIENCE AND PRACTICE OF PHARMACY (A. Gennaro, et al., eds., 19$^{th}$ ed., Mack Publishing Co., 1995).

"Pharmaceutical composition" means a formulation including an active ingredient. The word "formulation" means that there is at least one additional ingredient (such as, for example and not limited to, an albumin [such as a human serum albumin or a recombinant human albumin] and/or sodium chloride) in the pharmaceutical composition in addition to an active ingredient. A pharmaceutical composition is therefore a formulation which is suitable for diagnostic, therapeutic or cosmetic administration to a subject, such as a human patient. The pharmaceutical composition can be: in a lyophilized or vacuum dried condition, a solution formed after reconstitution of the lyophilized or vacuum dried pharmaceutical composition with saline or water, for example, or; as a solution that does not require reconstitution. As stated, a pharmaceutical composition can be liquid, semi-solid, or solid. A pharmaceutical composition can be animal-protein free.

"Treatment" or "treating" refers to any therapeutic intervention in a mammal, for example a human or animal, including: (i) prevention, that is, causing the clinical symptoms not to develop; (ii) inhibition, that is, arresting the development of clinical symptoms, e.g., stopping an ongoing infection so that the infection is eliminated completely or to the degree that it is no longer harmful; and/or (iii) relief, that is, causing the regression of clinical symptoms.

"Reducing", "suppressing" and "inhibiting" have their commonly understood meaning of lessening or decreasing.

Example 1

In this work, we investigated deep learning-based approaches for the long-term prediction of HbA1c measures using only 14 days of CGM data. Research has shown that convolutional neural networks (CNNs) perform well with images as input, and outperform traditional ML techniques. To exploit the benefits of CNNs, this work presents a novel transformation that converts the time-series CGM sensor data into spatial-based images. In addition, the fundamental challenges with traditional DL approach is that it requires a large-scale data set to train the DL model. In this study we implemented an alternative approach known as few-shot learning (FLS) to overcome the data limitation aspect of DL architectures. A novel normalized FSL-distance (FSLD) metric is proposed for accurately separating the images of different HbA1c classes.

Finally, a k-nearest neighbor (KNN) model with majority voting was implemented for advanced HbA1c class prediction. In summary, the present study offers the following significant contributions:

1) A retrospective data collection effort is initiated and data from 200 type 1 diabetes (T1DM) subjects are collected from CGM sensors.
2) A novel method is proposed for missing CGM data prediction.

3) A new feature extraction techniques is introduced to derive statistical biomarkers from BG data.
4) The time series CGM data is converted into spatial images and a FSL-based feature extraction is proposed.
5) A novel image distance metric FSLD is proposed for separating images corresponding to different HbA1c levels.
6) A KNN model is adapted for image classification based on the proposed FSLD metric.

Materials and Methods

A. Study Population

A retrospective data collection effort was initiated to collect the BG data from Sidra Medicine, Doha, Qatar. The institutional review board (IRB) of the Sidra Medicine approved the research plan (IRB Number, 1536761-1). All recruited subjects wore CGM sensors (Freestyle Libre) for 90-120 days. The CGM device comprised a glucose sensor implanted into the body's subcutaneous tissue. The sensors measured interstitial fluid glucose levels every 15 minutes and provided 96 measurements per day. The CGM sensors have a lifetime of 14 days, and then it was replaced with a new one.

The 14 days CGM data from the sensor were collected and saved to a secured memory disk. All the subjects continued using the CGM sensors for 90 days. The HbA1c level was measured for each subject on the 90th day of data collection at Sidra Medicine's laboratory. The data collection summary is provided in Table 1 shown in FIG. 14A. The data collection effort utilized the data of two hundred subjects (mean age 12.7±4.5 years; range 6-22 years) with T1DM during 2019 and 2020.

B. Data Analysis

Figure 2:
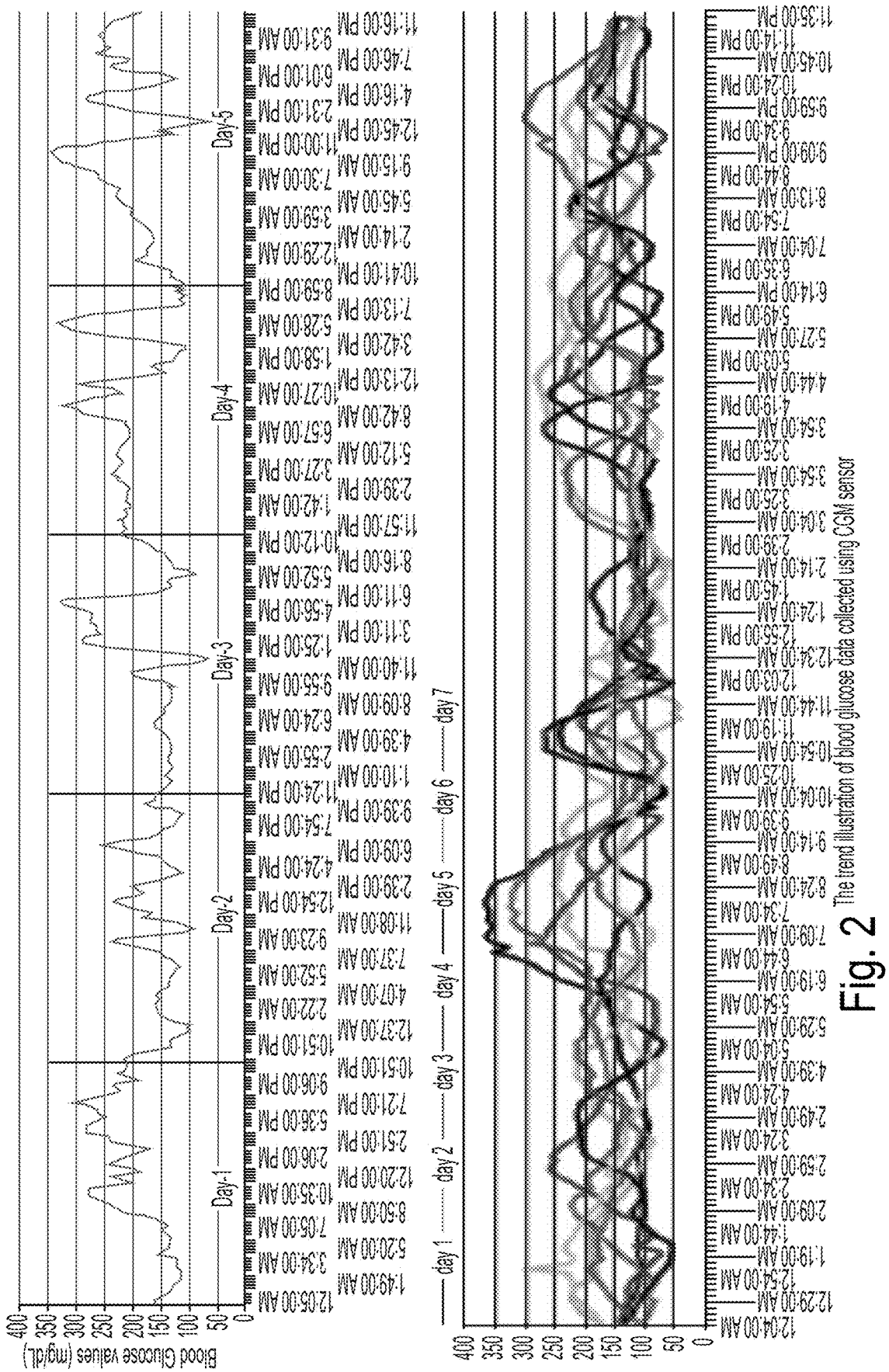
FIG. 2 shows the trend illustration of blood glucose data collected using CGM sensor.

The BG trends for a subject are shown in FIG. 2 for illustrative purposes. The y-axis represents BG values in mg/dL, and the x-axis displays the time duration from 12:00 am to 11:45 pm for five consecutive days. We have observed a trend in the BG values as outlined in the bottom sub-figure. The BG levels rise randomly at different times of the day. We observed several peaks during the morning, noon, and evening time. These observations indicate that the BG values follow a trend but the time for occurrence of peaks varies between the days. The rise of BG values greatly depends on food intake, and the subjects might not take their breakfast, lunch, and dinner at the same time on different days. These food intake changes makes the data modeling task challenging and prevents the development of a deterministic model from explaining the BG trends.

C. Data Preprocessing

1) Missing Data Prediction: In some instances, a user might take off their CGM device to either replace it or for other reasons. Additionally, in some cases, the CGM device might become dislodged from the user and not be able to record particular BG data points. To address the case of missing data in time-series CGM, a data processing stage was incorporated to i) evaluate the amount of missing data and ii) develop a missing data prediction method to impute short spans of missing data. A nearest neighbors approach was implemented for missing data prediction when there were two or more missing data points. The BG values from eight neighbors were considered in replacing the missing values.

Figure 3:
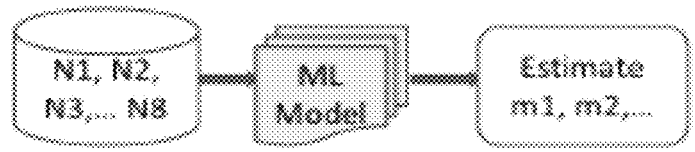
FIG. 3 depicts prediction of missing CGM data points using rectangular nearest neighbours method.
Figure 4:
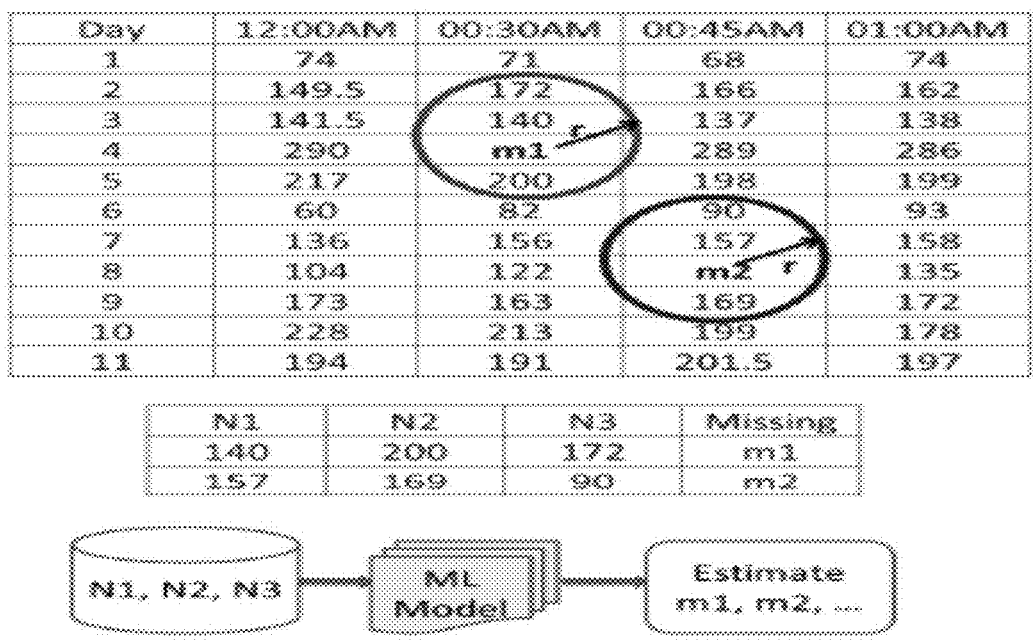
FIG. 4 shows the prediction of missing CGM data points using circular nearest neighbours method.

FIG. 3 shows an example where a patient's CGM reflects two instances of missing BG measurements. The missing data (m1;m2) were estimated using a ML method with considering the nearest BG values as neighbors. The nearest neighbors were found by drawing a rectangle around the missing instances or a circle with varying its radius as shown in FIG. 4. The inter and intraday BG values are included for multiple missing data points prediction. Some random single and multiple data points have been eliminated to assess the efficacy of the predictions. The missing values were then predicted by the mentioned nearest neighbors approach.

2) Data Preparation: This research analyzed 200 patients' 3000 days CGM sensor data. The patients were split into four and six distinct classes based on their HbA1c control levels, as outlined in Tables 2 and 3 shown in FIGS. 14B-14C. The class, C1, consists of 47 subjects with HbA1c levels ≤7.5%. The subjects in C1 had HbA1c values in the expected range defined by clinicians and therefore were referred-to as the "good" control group. The subjects with HbA1c levels in the range (7.5%-9%) were assigned to the class C2. The patients in C2 had their HbA1c values above the expected levels and therefore, they were defined as "medium" control group. The subjects with HbA1c levels between 9% and 12.5% were grouped together in class C5. The patients belonging to the class C3 had their HbA1c values significantly higher than the expected levels. Therefore, the subjects in C3 were defined as "poor" control group. Finally, the subjects with HbA1c levels >12.5% were grouped together in the class C4. The patients in the C6 had their HbA1c values very high as compared to the expected levels. Therefore, the subjects in C6 were referred as uncontrolled group. Furthermore, the subjects were split into ten classes to evaluate the proposed model's efficacy in predicting a narrow range of HbA1c levels. The class S1 consists of 25 subjects with HbA1c levels ≤6.5%, while a total of 125 subjects whose HbA1c values >6.5% were assigned to the class S2. The remaining classes formed by including subjects based on different HbA1c ranges were S3, S4, S5, S6, S7, S8, S9, and S10, as outlined in Table 3 shown in FIG. 14C.

Proposed Methodology

Figure 5:
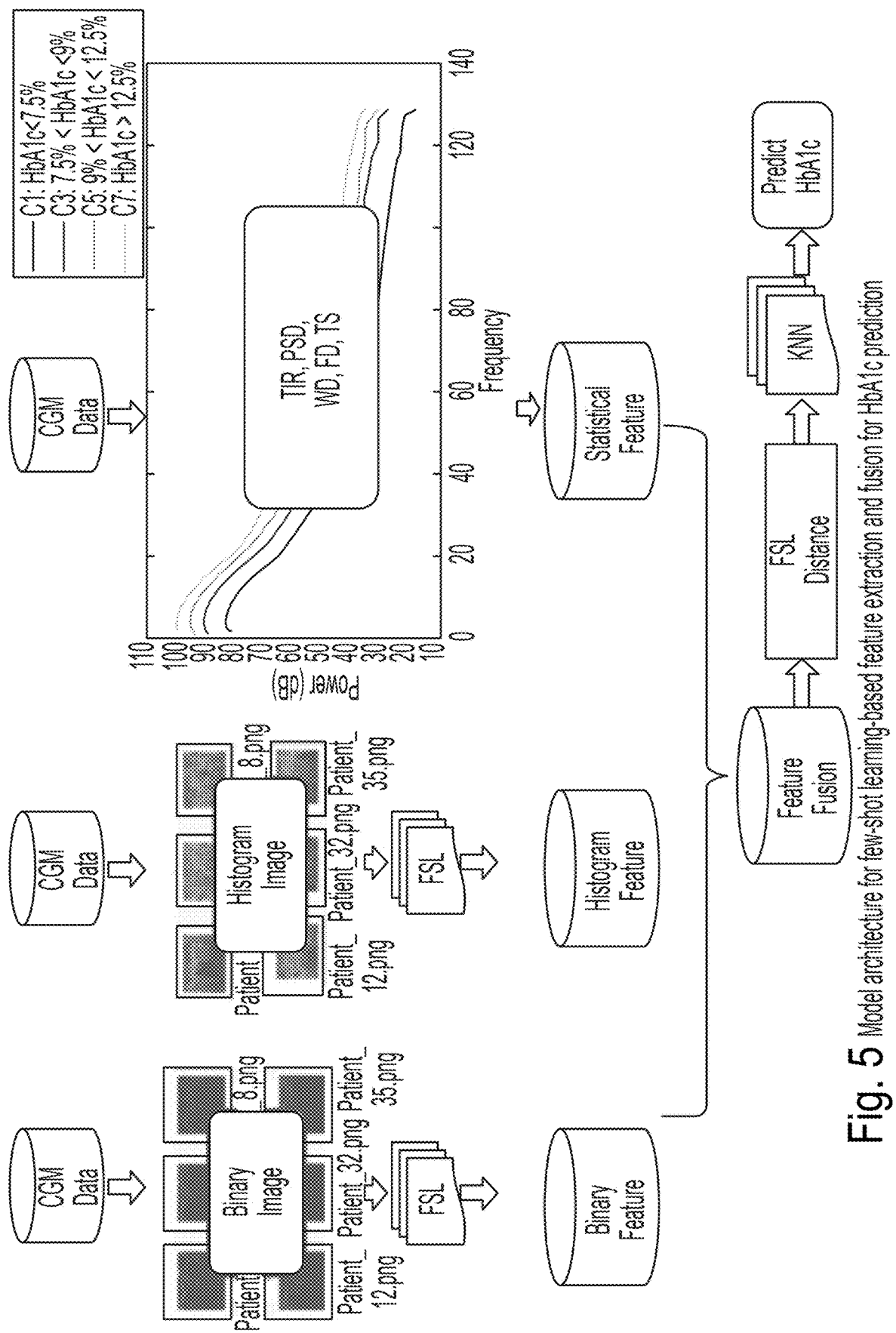
FIG. 5 depicts model architecture for few-shot learning-based feature extraction and fusion for HbA1c prediction.

The proposed methodology of converting time series data into images and applying FSL techniques for feature extraction is summarized in FIG. 5. The extracted binary and histogram images were fed to the FSL-based CNN model for feature extraction. The extracted FSL-based feature vectors are normalized using a novel distance normalization metric FSLD. The extracted features from binary and histogram images were fused with the statistical features to form a final feature vector. Finally, a KNN model with a majority voting approach was implemented to determine the outcome class of HbA1c levels.

A. Conversion to Binary-Based Images

Figure 6:
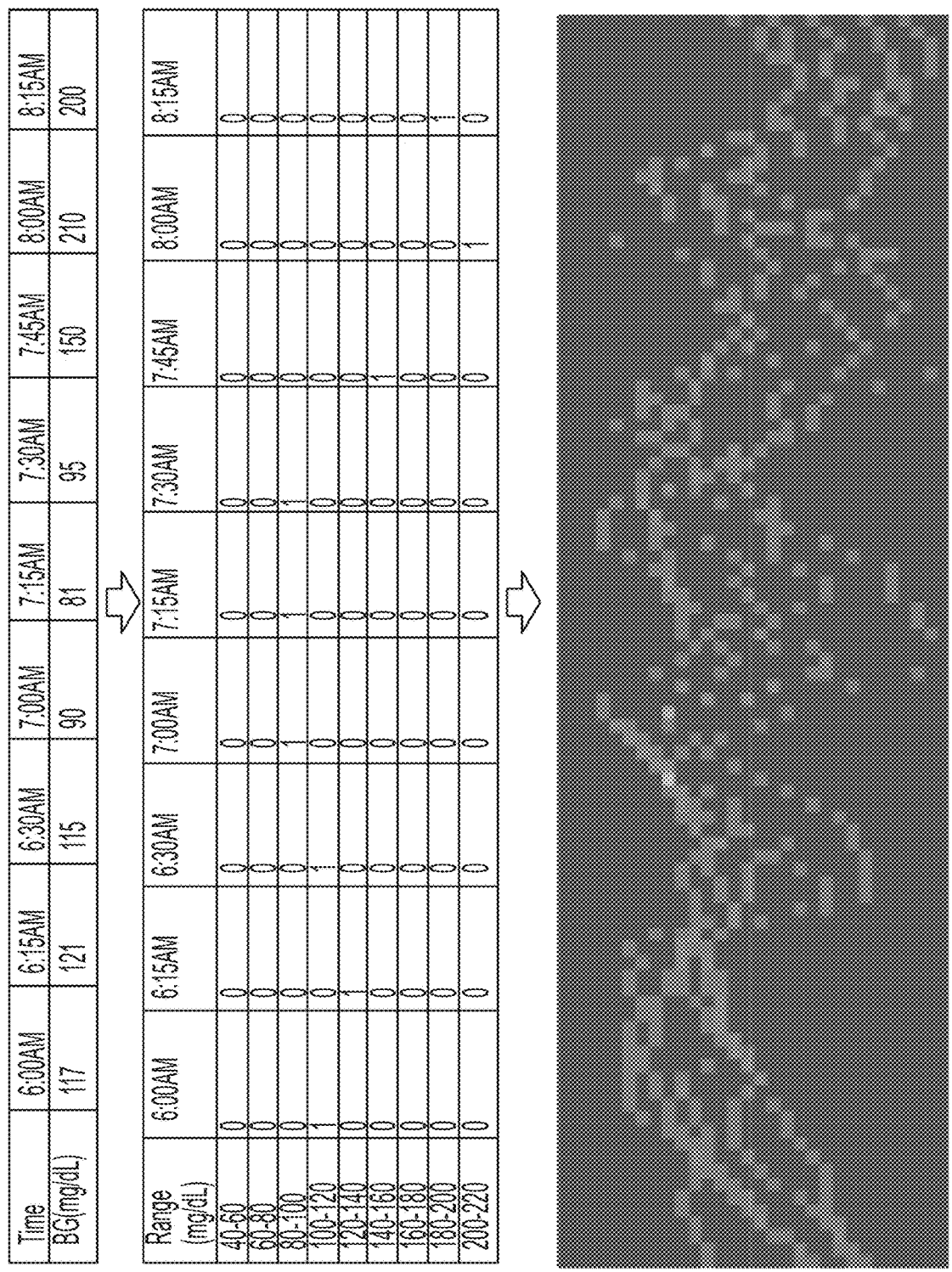
FIG. 6 depicts the conversion of CGM sensor data to binary image illustration.

During the conversion of the time series CGM sensor data into binary images, each pixel of the converted binary image was stored in a single bit (0 or 1). The transformation of the time-series CGM data to binary spatial images is illustrated as shown in FIG. 6. All the CGM values were categorized into multiple ranges (40-60, 60-80, 80-100, 200-220 mg/dL etc.). The BG value was encoded by 1 for each data point and stored in the assigned range categories for the corresponding timestamp.

The procedure was repeated for all 15 days of BG data points. Then the remaining positions of the matrix for which there is no encoded 1 were filled with zeros. For example, the BG value of 117 mg/dL at 6:00 am falls in the range of 100-120 mg/dL. Therefore, the corresponding position was encoded with 1, and the remaining positions were filled with zeros. Finally, the generated matrix was converted into a binary spatial image as shown in FIG. 6 for illustrative purposes. The x-axis of the converted binary image represents number of timestamps and y-axis displays range categories. The light blue color coding of binary image indicates 1 and dark blue color coding represents 0. When there were more than one encoded 1 for the same range on the same timestamp, then the encoded ones were added (which results in high pixels values (>1) in few positions of the generated binary image). As the majority of the pixels values of the generated images were zeros and ones, therefore, we named the output image as binary. The variations in color information emerged as potential features that can be extracted using DL model to separate images of different HbA1c levels.

B. Histogram-Based Images

Figure 7:
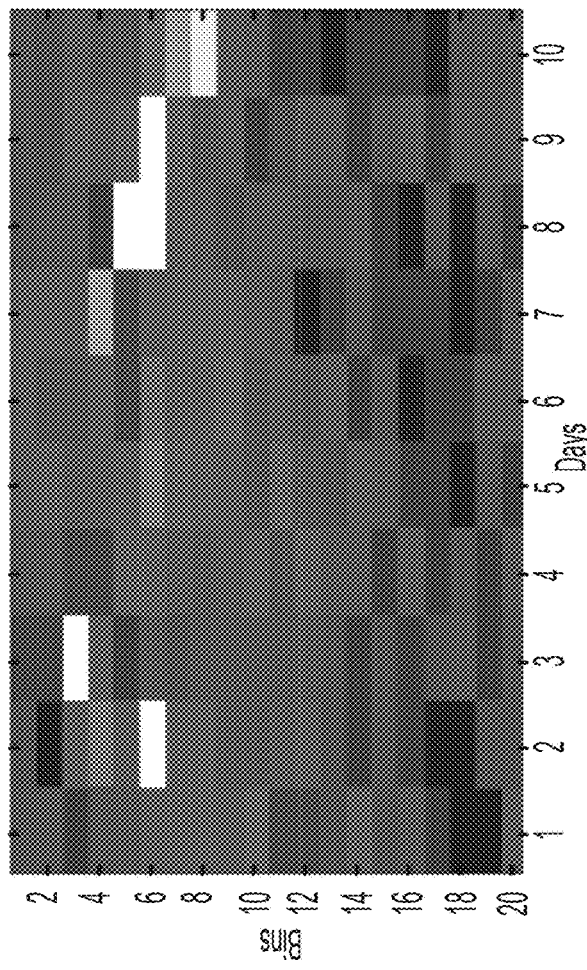
FIG. 7 shows the conversion of CGM sensor data to histogram image illustration.

The transformation of time series data to histogram-based representation were extensively used for image classification task because of its straightforwardness and discrimination capability. Histogram approximate the distribution of the numerical data. To construct a histogram of data, the first step was to portion the entire data range into a number of intervals and measure the frequency (i.e. count number) of values fall in each intervals. The interval must be non-overlapping and adjacent with equal bin size. The histogram was generated based on:

$$N = \sum_{j=1}^{B} m_j \qquad (1)$$

where, N is the total number of observations, B is the number of bins, and m is the bin count. The bin width can be varying to reveal the different hidden features of the data. A wider bin width facilitates reducing the noise that occurs due to random data selection. A narrower bin width provides a better prediction of the data density. To find the bin length (L), the data points were sorted in ascending order. Then the sorted data were partitioned to find L based on:

$$L = \frac{R}{B} \qquad (2)$$

where, R is the range of data. In this research, the CGM sensor data was converted into histogram images with 20 and 50 bins. First, the BG values correspond to a complete day i.e. 96 measurement for a subject were sorted and split into 50 bins. The sorting and splitting process was repeated for 15 days for each subject and concatenated to transform 1-dimensional BG vector into a 2-dimensional matrix with size 50×15. Finally, the output matrix was converted into histogram image using Matlab software. FIG. 7 illustrates the conversion of CGM sensor data into histogram image for a randomly selected subject. The x-axis of the converted histogram image represents number of days and y-axis displays bin numbers. The light blue color coding indicates low bin frequencies and yellow color coding represents high bin frequencies.

C. Statistical Feature Extraction

Feature extraction is one of the fundamental steps in ML-based classification tasks. The collected raw BG data were transformed to extract pertinent features to have improved model performance. This study introduced seven different feature extraction methods using CGM data for advanced HbA1c prediction. Time in range (TIR) was defined by the proportion of time a patient's BG passes in a specific range over the total time period analyzed. The typical range for a diabetic should be within 70-180 mg/dL. TIR and HbA1c have been found to exhibit high correlation. This research work leveraged the correlation and introduces novel TIR features to detect fluctuations in BG levels that are significantly interrelated with HbA1c. In particular, seven TIR, time below range (TBR), and time above range (TAR) features are defined as shown in the following equations:

$$TBR_{54} = \frac{\sum_{t=1}^{N}(C(x_t) \leq 54)}{N} \qquad (3)$$

$$TBR_{70} = \frac{\sum_{t=1}^{N}(C(x_t) \leq 70)}{N} \qquad (4)$$

$$TIR_{70-180} = \frac{\sum_{t=1}^{N}(C(x_t) \geq 70 \wedge \leq 180)}{N} \qquad (5)$$

$$TIR_{180-250} = \frac{\sum_{t=1}^{N}(C(x_t) \geq 180 \wedge \leq 250)}{N} \qquad (6)$$

$$TIR_{250-300} = \frac{\sum_{t=1}^{N}(C(x_t) \geq 250 \wedge \leq 300)}{N} \qquad (7)$$

$$TIR_{300-350} = \frac{\sum_{t=1}^{N}(C(x_t) \geq 300 \wedge \leq 350)}{N} \qquad (8)$$

$$TAR_{350} = \frac{\sum_{t=1}^{N}(C(x_t) \geq 350)}{N} \qquad (9)$$

where C represents overall counts, TBR stands for time below range, TAR is the time above range, x stands for individual BG values, and N represents the sample size. Glucose variability (GV) represents the measure of oscillations in BG levels for a defined time such as during a day or among days. The GV was considered one of the fundamental indexes used to assess the patient's overall glucose profile. In this study, different GV features were extracted using CGM data as these features are significantly correlated with HbA1c values. The coefficient of variation (CV) was expressed as a percentage whose high value indicated greater dispersion around the mean. The CV is often preferred over SD as a GV feature because the mean highly influences SD. Data with a high mean value usually have a high SD. Thus, to normalize the variability, the SD is divided by the mean while calculating the CV based on:

$$CV = \frac{\sigma_{BG}}{\mu_{BG}} \times 100 \qquad (10)$$

where µ is the mean of BG values, and XX is the standard deviation of BG. The GV index M100 provides a measure of the variation of glucose values around 100 mg/dL is calculated based on:

$$M100 = \frac{\sum_{i=1}^{n} 1000 \times \log\frac{x_i(\text{mg/dL})}{100}}{n} \qquad (11)$$

Another important GV index, J-index, is a measure of glucose variability used to assess the patient's glycemic profile calculated from average and SD is found by:

$$J\text{-index} = 0.001 \times (\sigma_{BG} + \mu_{BG})^2 \qquad (12)$$

Mean amplitude of glycemic excursion (MAGE) is another important metric used for evaluating a patient's glycemic variation. The MAGE is derived by calculating the deviations between the successive top and bottom values larger than one SD of average BG is obtained using:

$$MAGE = \sum \left(\frac{\lambda}{n}\right) \qquad (13)$$

The mean of daily differences (MODD) indicates glucose fluctuations between days. MODD is derived as the average of absolute differences among the BG levels of consecutive days and is calculated based on:

$$MODD = \frac{\sum_{i=24h}^{n}(x_i - x_{i-24h})}{n} \qquad (14)$$

Continuous overall net glycemic action (CONGA) measures glycemic variability within a defined time window. The CONGA is computed by taking the differences among the BG data points, and then SD is calculated on these differences:

$$CONGA = \sqrt{\frac{\sum_{i=1}^{n}(x_i - x_{i-1}) - \frac{\sum_{j=1}^{n}(x_i - x_{j-1})}{n-1}}{n-t-1}} \qquad (15)$$

D. Few Shot Learning-Based Image Distance Metric

Figure 8:
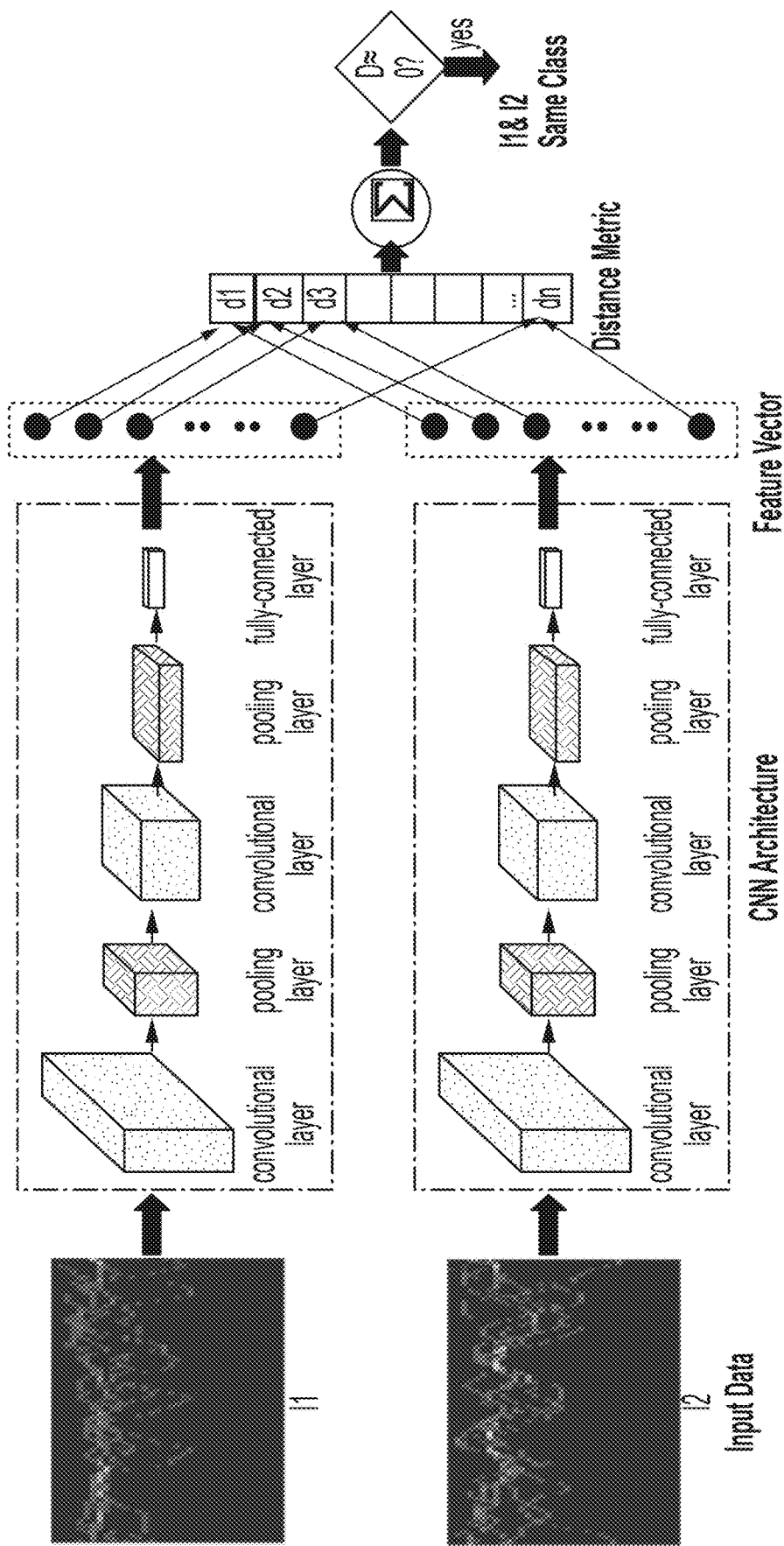
FIG. 8 shows the proposed FSL-based feature extraction.

FSL is a simple yet flexible approach in recognizing images given few to none training examples. During training, the FSL method is used to extracts a feature vector for the image samples followed by calculating distance between images as shown in FIG. 8. The distances for the images from the same category are lower than those distances from different categories. After finishing the training, the FSL model can predict the test image's class label by calculating the distances from each category and assigns the test image to the class with the lowest distance. This research uniquely implements in essentials of the FSL techniques to extract features from the binary and histogram images. The FSL-based approach involves two identical CNN architectures consist of convolutional layers, pooling layers and fully-connected layers. The process also utilized activation functions such as rectified linear unit (ReLU), leaky ReLU, and batch normalization.

Convolution layers are the fundamental building block of CNN network, that applies filters repeatedly to the input images to generate a feature map of the input. The convolution layers automatically generate a large number of filters in parallel for solving problems in hand such as image classification. The outcome of the convolution layers are the low-level features (e.g. lines) and high-level features (e.g. shapes, objects) of the input images. This research uses 128, 64, and 32 different filters in different branch of convolutional layers to extract feature maps from binary and histogram images. A pooling layer is added immediately after the convolution layer that provides the same number of features maps but with reduced size through filtering. We have used maximum pooling and average pooling filter of size 2×2 with a stride of 1 and 2. The maximum pooling provides the maximum value for each patch of the feature map while average pooling calculates the average value for every patch of the feature map. The significance of using pooling layers is that the model becomes invariance for a local translation i.e. a small rotation, position alteration of input image will not change the feature maps.

Furthermore, a fully-connected layer, also known as flatten layer, is added that takes input from previous pooling layer and generate a single feature vector representing high level features of the input image. A fully-connected layer with size 128 is found optimal for our image-based classification task. The ReLU layer provides output the same input if the value is positive, otherwise, zero based on—

$$\text{ReLU}(x) = \max(0, x) \qquad (16)$$

where, x is the input value provided to the ReLU layer comes from convolution layer. Additionally, batch normalization modifies input data through re-centering and re-scaling to have zero mean and unit variance for making the process stable and faster by reducing the number of training episodes during model development. The FSL-based feature extraction are followed by distance measurement using a novel FSLD metric. The feature vectors of two images (I1, and I2) are calculated using two identical CNN architectures and then their differences are measured to find the distances (d1, d2, d3, - - -, dn). The proposed FSLD vector has been calculated for the images I1 and I2 based on—

$$FSLD(I_1, I_2) = \begin{cases} 0, & \text{if } |I_1 - I_2| \le a \\ \left(\frac{|I_1 - I_2|}{\max(|I_1|, |I_2|)}\right)^a, & \text{otherwise} \end{cases} \qquad (17)$$

where a is any arbitrary values of 0.1, 0.2, and 0.3, I1 and I2 are two images, and a takes a value of 0.5, 1, and 2. For the smaller values of FLSD such as 0.1, 0.2, and 0.3, the FSLD values are encoded with zeros. The intuition behind this normalization was that, the proposed FSLD will be close to zero for the images from the same class. Therefore, we normalized the FSLD metric and replaced with zeros if it is below a certain threshold value (a=0.1, 0.2, 0.3). Furthermore, for a distance value larger than 0.3, the FSLD value is further processed by dividing it with the maximum feature values of the corresponding images, I1 and I2. The distance between two images of the same class will be lower than the distances between two images of different classes. We assume that the calculated distance for images of the same class will be near zero, and for different classes, the FSLD will be close to 1. Then a threshold line can separate the distances for different classes that will facilitate classifying a new test sample based on a threshold value. Moreover, the FSLD value is raised to the power of a which varies with a fractional value of 0.5, and integer values 1, and 2 to maximize the separation margin between distances. This normalization facilitates a clear separation of FLSD distances of images from same class to the FSLD distances of images from different classes.

E. Data Augmentation and Classification

The data augmentation techniques are often used in data analysis to increase the amount of data by slightly modifying the original data. The success of DL techniques largely depends on large-scale data. For smaller-scale data, the DL model typically performs poorly. The indirect data augmentation processes for four and six classes are summarized in Tables 4 and 5 shown in FIGS. 14D-14E. The indirect data augmentation process has not changed the original structure of the data; instead, the original data have been split into different groups based on the FSLD distances to increase the data size. In the traditional data augmentation process, the original structure of the data is changed. For example, image data are flipped, translated, or rotated, which can distort the image. Our approach was indirect as the original structure of the data was not changed.

Figure 9:
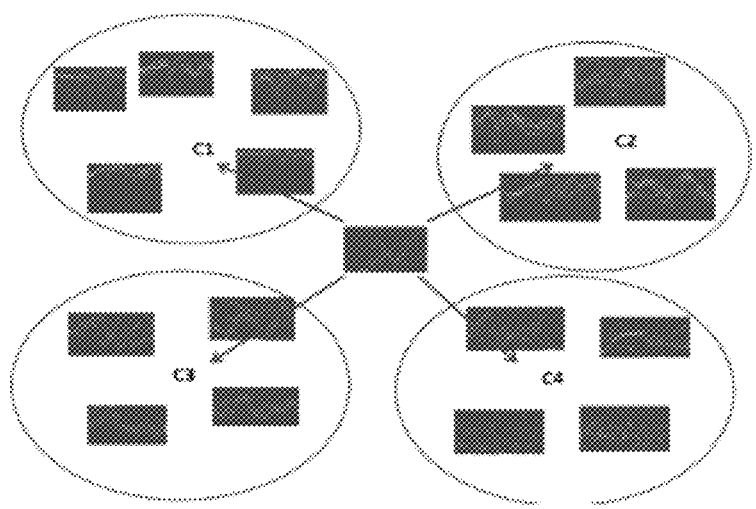
FIG. 9 shows the proposed k-nearest neighbor approach of test image classification.

To evaluate the performance of our proposed FSL-based feature extraction and the FSLD metric's capability in separating images of different classes, we implemented a KNN approach for the classification of the test sample, as shown in FIG. 9. Instead of using Euclidean distance, we have used our proposed FSLD, discussed in Section III-D. First, the feature vector of the test image (X) is generated using the mentioned FSL-based feature extraction. The distances between the X and all other train images of class C1, C2, and C3 are calculated using our proposed FSLD metric. These distances are then sorted in increasing order, and their corresponding class levels are tracked down. To determine the test image's class level, the class levels of the sorted smallest distances are evaluated. The nearest neighbors (k) values are referred to as those smallest distances and tuned to find the optimal one. The value of k=10 is found optimal for which the proposed approach achieves better performs on test images. Ultimately, the majority voting technique is used for class assignment of the test image. In majority voting, each of those ten neighbors provides a vote about the class level of X. All ten votes are counted, and the class assignment of X is finalized to the class with the highest number of votes. The same procedure is repeated for all test images and the overall accuracy is calculated using—

$$\text{Accuracy} = \frac{\text{correctly classified instances}}{\text{Total instances}}. \quad (18)$$

IV. RESULTS AND DISCUSSION

Figure 10:
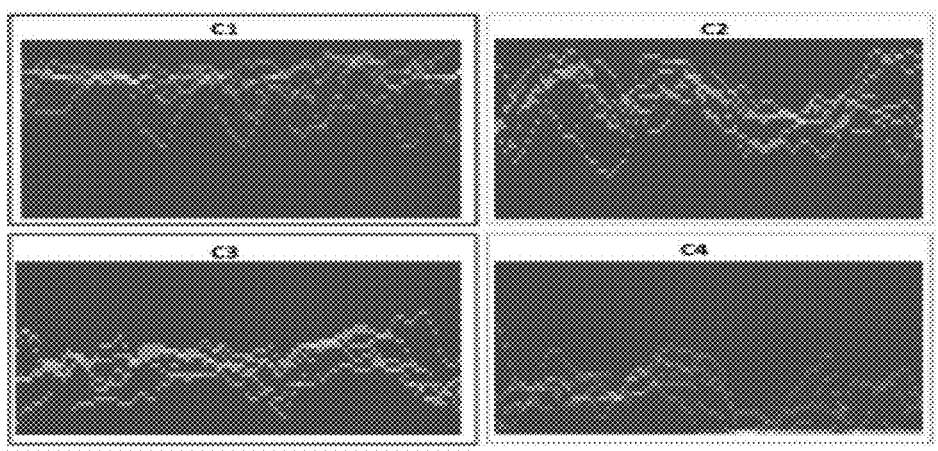
FIG. 10 depicts the proposed k-nearest neighbor approach of test image classification.

The time series CGM sensor data converted to binary images for four classes C1, C2, C3, and C4, are shown in FIG. 10. For the images of C1, we have observed high pixel values at the top level. However, for the images of C4, the high pixel values lie in the bottom part of the image. This implies that the BG values for subjects of C1 fall in the lower range compared to the BG values of subjects from C4.

A significant visual difference between the images of C1 and C2, C3, C4 has been observed.

Figure 11:
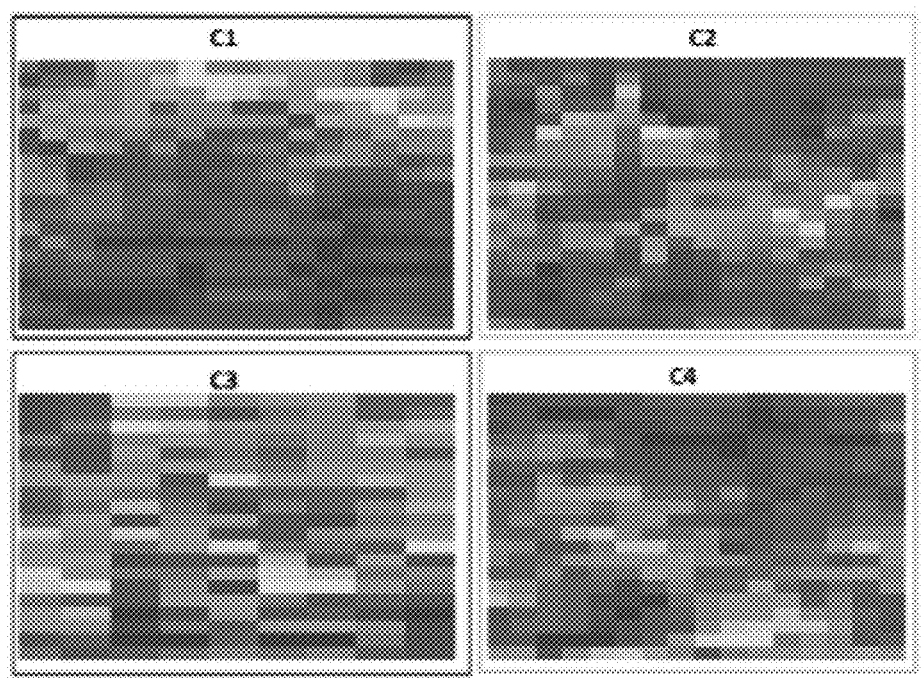
FIG. 11 shows the comparison of histogram images among four classes-C1, C2, C3, and C4.
Figure 12:
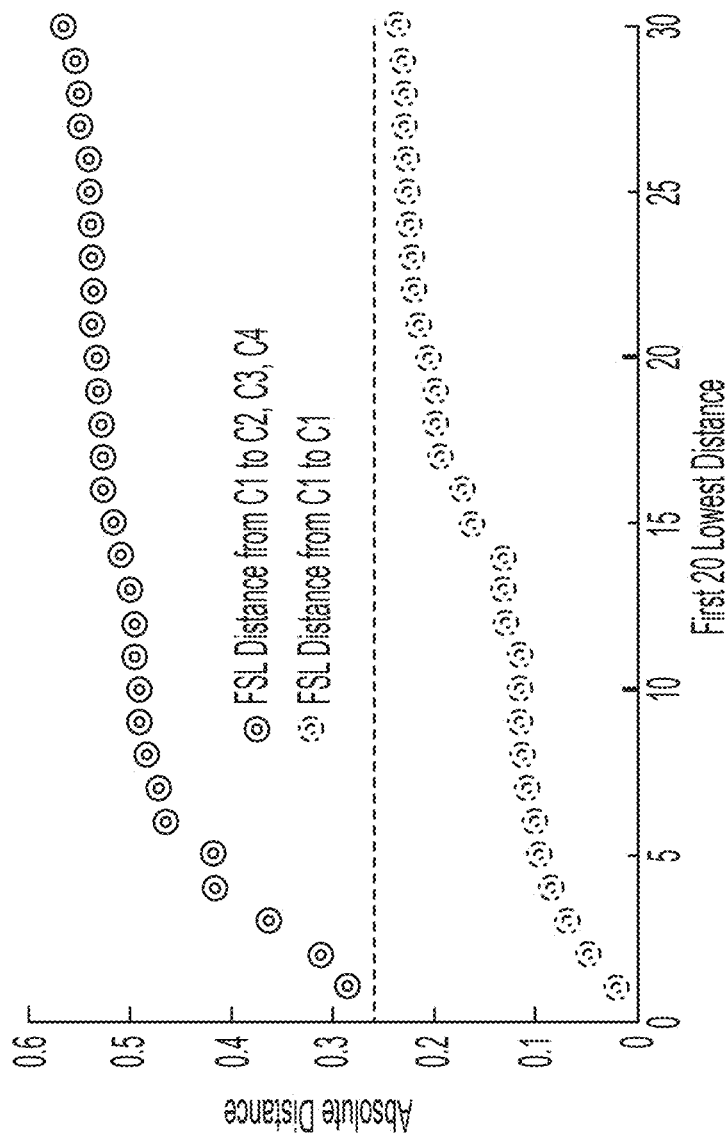
FIG. 12 shows the hyperplane that separates the FSLD feature values between C1 and C2, C3, C4.

The histogram images for four classes are shown in FIG. 11. The BG values are partitioned into 20 bins while converting the CGM sensor data into histogram images. We have found that the top bin frequencies of the C1 are significantly higher as compared to C4. However, the bottom bin frequencies of histogram images are significantly higher for C4 than C1, C2, and C3. The calculated FSLD for images of the same class are observed be close to zeros, and for different classes, the FSLD are found be close to 1. Then, a thresholding line is drawn that clearly separates the FSLD for different classes as shown in FIG. 12.

The all four-class separation results for binary, histogram images, and statistical features are summarized in Table 6 shown in FIG. 14F. The images have been split into training (80%) and testing (20%) during model development and evaluation. For binary images, accuracies of 91.40% and 87.56% are obtained during training and testing of the model. The test accuracies of 86.25% and 85.50% have been found for histogram images and statistical features. The highest test accuracy of 90.26% is observed by fusing the binary, histogram, and statistical features. The developed model also has been evaluated on the data comprised of six distinct classes. During all six-class separation, test accuracy of 84.75%, 81.40%, and 82.23% was achieved for the binary, histogram, and statistical features as outlined in Table 7 shown in FIG. 14G. The best performance with an accuracy of 85.51% has been found by fusing the binary, histogram, and statistical features. The feature fusion approach has displayed a better performance for both four and six class classification tasks than any single set of features.

The classification results with data augmentation approach for four classes of HbA1c levels prediction are summarized in Table 8 shown in FIG. 14H. The test accuracy of 90.75% has been obtained while differentiating the images from class C1 to the rest classes (C2, C3, C4). We found similar test accuracies for other classes. The accuracies are 89.37%, 90.7%, and 90.22% during the separation of C2, C3, and C4 from the remaining groups. The overall highest accuracy of 92.30% was found for four class classification. Furthermore, the performance of data augmentation approach for six classes are presented in Table 9 shown in FIG. 14I. During the separation of S1 vs. the remaining distinct classes (S3, S5, S7, S9, and S10), up to 87.6% and 85.22% accuracy has been observed for train and test data, respectively. The highest overall test accuracy of 87.73% is obtained during six class classification.

The FSL-based approach with absolute distance measure was used in the literature for alphabet classification using publicly available onmiglot dataset and achieved 88% accuracy for 1-shot learning with convolutional Siamese nets. Our research has proposed a novel distance metric, FSLD, instead of using absolute difference. First, we converted timeseries data into images, followed by FLS-based feature extraction and distance calculation using the FSLD metric. Then a KNN with FSLD is implemented for image classification correspond to different HbA1c levels.

We have observed that our approach outperformed previous studies which used the traditional ML model for HbA1c prediction. For the first time in the literature, FSL-based feature extraction with a novel FSLD metric has been implemented for HbA1c prediction application. Instead of using absolute differences of images as used previously, we have proposed a distance metric, FSLD, to separate images correspond to different HbA1c levels. This research is novel because it proposed conversion time-series sensor data into spatial images and extracted new FSL-based features for advanced HbA1c prediction. The proposed FSLD metric has the potential to separate images of different categories effectively. This study achieved improved performance as compared to previous ML-based studies. This research has significant implications both in the area of diabetes management and for data-driven model development. First, the research predicted HbA1c level 2-3 months in advance which can aid healthcare professionals and patients by providing futuristic knowledge about their glucose profile and thus proper management of diabetes can an ensured through necessary interventions. Second, the developed framework can be generalized for any other image-based classification task for real-world applications where available data are very limited in size specially in healthcare.

V. RESULTS BENCHMARKING

Long term prediction of HbA1c is a challenging task as it depends on the subjects' lifestyle and biological factors. The prediction of HbA1c has not been tackled in the literature due to complexity; however, with recent computational advances, this work successfully builds an HbA1c prediction algorithm using short term CGM data. Previous work has attempted to only estimate the current and instantaneous HbA1c. The estimated HbA1c levels are sometimes way off from the actual HbA1c values. This estimation, with large deviation, may often misguide healthcare professionals while taking necessary preventive interventions. However, predicting accurate HbA1c values into a specific range, such as between 7.5% and 9% as an example, appears to be more beneficial for diabetes management. The study, as outlined in Table 10 shown in FIG. 14J, calculates the present HbA1c values using the current BG data. The HbA1c values are significantly related with recent BG values as compared to the previous values. Furthermore, the extraction of pertinent features utilizing CGM sensor data to forecast HbA1c have not been explored. For the first time in literature that HbA1c prediction is attempted by applying an MSMC classification framework in our previous study. The missing data treatment, feature extraction, selection, and fusion, combined with the MSMC framework, obtained an overall accuracy of 88.65% and 83.41% for the three-staged and five-staged classification tasks, respectively. The present FSL-based study outperforms MSMC-based ML approach and achieved highest accuracy of 93.20%. The developed framework has an excellent perspective for both doctors and patients to arrange preemptive actions as they are now well-informed of a person's future HbA1c levels and infer the possibility of developing diabetes-related difficulties. The interventions or treatment can be started early to avoid complications and prolong healthier living.

An attempt is also made to evaluate the performance of our proposed FSL-based feature extraction and FSLD approach using a publicly available benchmarked dataset. We have tested our framework on the CIFAR10 dataset. The dataset consists of 50,000 train images and 10,000 test images of ten various classes as shown in FIG. 13. The performance of the proposed model when tested on the CIFAR10 data is outlined in Table 11 shown in FIG. 14K. The proposed model achieved the highest test accuracy of 94.89% during differentiating images from the airplane category vs. all other image categories. The model obtained an overall average accuracy of 93.20% when tested on its ability to discriminate all image classes.

Although the state-of-the-art performance for CIFAR10 dataset classification is higher than the result we achieved as outlined in Table 12 shown in FIG. 14L, we have only used a fraction (5%) of the original dataset to implement our FSL-based feature extraction approach. Our model is faster in processing the selected small scale data. It takes only 60-120 seconds to generate result for the FSLD metric in Matlab software. However, it takes hours to train the model while using the traditional deep CNN model. Furthermore, the approach does not require high-end resources such as GPU and TPU. We have used a laptop machine with a CPU (Intel Core i5, 2.50 GHz Processor, 8 GHZ RAM) to process the data and build the framework.

VI. CONCLUSION

This study dealt with the conversion of CGM sensor timeseries data into binary and histogram images to further improve the HbA1c prediction task for the first in the literature. The generated images were passed through a CNN framework for FSL-based feature extraction. The extracted features were further processed using our proposed FSLD metric, and distances between images were calculated. A thresholding hyperplane was established to separate the distances of images from the same class to distances of images from different classes.

Finally, a KNN model was implemented, and test images were assigned to the class with majority vote counting. Additionally, the developed FSL-based framework was evaluated using a benchmark dataset known as CIFAR10. We observed that the proposed FSL-based feature extraction and the FSLD metric can separate images from one class to another in an effective way. Our approach's advantage is that it does not require a large-scale dataset as needed in DL model development. Instead, a few images (~20) from each category were used to train the model. Our proposed FSL-based approach achieved an accuracy of 92.30% and outperformed the traditional ML-based techniques, for which accuracy of 88.65% was obtained.

Unless otherwise indicated, all numbers expressing quantities of ingredients, properties such as molecular weight, reaction conditions, and so forth used in the specification and claims are to be understood as being modified in all instances by the term "about." Accordingly, unless indicated to the contrary, the numerical parameters set forth in the specification and attached claims are approximations that may vary depending upon the desired properties sought to be obtained by the present invention. At the very least, and not as an attempt to limit the application of the doctrine of equivalents to the scope of the claims, each numerical parameter should at least be construed in light of the number of reported significant digits and by applying ordinary rounding techniques. Notwithstanding that the numerical ranges and parameters setting forth the broad scope of the invention are approximations, the numerical values set forth in the specific examples are reported as precisely as possible. Any numerical value, however, inherently contains certain errors necessarily resulting from the standard deviation found in their respective testing measurements.

The terms "a," "an," "the" and similar referents used in the context of describing the invention (especially in the context of the following claims) are to be construed to cover both the singular and the plural, unless otherwise indicated herein or clearly contradicted by context. Recitation of ranges of values herein is merely intended to serve as a shorthand method of referring individually to each separate value falling within the range. Unless otherwise indicated herein, each individual value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein is intended merely to better illuminate the invention and does not pose a limitation on the scope of the invention otherwise claimed. No language in the specification should be construed as indicating any non-claimed element essential to the practice of the invention.

Groupings of alternative elements or embodiments of the invention disclosed herein are not to be construed as limitations. Each group member may be referred to and claimed individually or in any combination with other members of the group or other elements found herein. It is anticipated that one or more members of a group may be included in, or deleted from, a group for reasons of convenience and/or patentability. When any such inclusion or deletion occurs, the specification is deemed to contain the group as modified thus fulfilling the written description of all Markush groups used in the appended claims.

Certain embodiments of this invention are described herein, including the best mode known to the inventors for carrying out the invention. Of course, variations on these described embodiments will become apparent to those of ordinary skill in the art upon reading the foregoing description. The inventor expects skilled artisans to employ such variations as appropriate, and the inventors intend for the invention to be practiced otherwise than specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

Specific embodiments disclosed herein may be further limited in the claims using consisting of or consisting essentially of language. When used in the claims, whether as filed or added per amendment, the transition term "consisting of" excludes any element, step, or ingredient not specified in the claims. The transition term "consisting essentially of" limits the scope of a claim to the specified materials or steps and those that do not materially affect the basic and novel characteristic(s). Embodiments of the invention so claimed are inherently or expressly described and enabled herein.

Furthermore, numerous references have been made to patents and printed publications throughout this specification. Each of the above-cited references and printed publications are individually incorporated herein by reference in their entirety.

In closing, it is to be understood that the embodiments of the invention disclosed herein are illustrative of the principles of the present invention. Other modifications that may be employed are within the scope of the invention. Thus, by way of example, but not of limitation, alternative configurations of the present invention may be utilized in accordance with the teachings herein. Accordingly, the present invention is not limited to that precisely as shown and described.

What is claimed is:

1. A method for predicting HbA1c values comprising:
    collecting HbA1c time series data of a patient across a plurality of days at a plurality of times for each day of the plurality of days;
    converting the HbA1c time series data into a histogram image formatted to indicate a distribution of numerical values in HbA1c time series data organized by a number of days in the plurality of days as a first coordinate in the histogram image and a bin into which a given numerical value of the numerical values in the HbA1c time series data is classified as a second coordinate in the histogram image;
    analyzing the image using a convolutional neural network;
    predicting a predicted HbA1c level for the patient at a future time point; and
    in response to the predicted HbA1c level for the patient being greater than or equal to a predefined threshold at the future time point, prescribing a treatment plan for the patient for administration of a therapeutic agent before the future time point.

2. The method of claim 1, wherein the predefined threshold is 6.5.

3. The method of claim 1, wherein the therapeutic agent administered according to the treatment plan comprises metformin.

4. The method of claim 1, wherein the therapeutic agent administered according to the treatment plan comprises insulin.

5. A method for evaluating diabetes progression comprising:
    collecting HbA1c time series data of a patient across a plurality of days at a plurality of times for each day of the plurality of days;
    converting the HbA1c time series data into an image that represents the HbA1c time series data organized using timing of when individual values in the HbA1c time series data as a first coordinate in the image;
    analyzing the image using a convolutional neural network;
    predicting a predicted HbA1c level for the patient at a future time point; and
    in response to the predicted HbA1c level for the patient being greater than or equal to a predefined threshold at the future time point, prescribing a treatment plan for the patient for administration of a therapeutic agent before the future time point.

6. The method of claim 5, wherein the future time point is at least one week in the future from predicting the predicted HbA1c level.

7. The method of claim 5, wherein the future time point is at least two weeks in the future from predicting the predicted HbA1c level.

8. The method of claim 5, wherein the future time point is at least three weeks in the future from predicting the predicted HbA1c level.

9. The method of claim 5, wherein the future time point is at least four weeks in the future from predicting the predicted HbA1c level.

10. The method of claim 5, wherein the image is a binary image formatted to indicate a count of measurements in the HbA1c time series data that are organized by which day in the plurality of days the measurements in the HbA1c time series data were collected on as the first coordinate in the binary image and which range of a plurality of a ranges of values that a given measurement of the measurements in the HbA1c time series data is categorized into as a second coordinate in the binary image.

11. The method of claim 5, wherein the image is a histogram image, formatted to indicate a distribution of numerical values in the HbA1c time series data organized by a number of days in the plurality of days as the first coordinate in the histogram image and a bin into which a given numerical value of the numerical values in the HbA1c time series data is classified as a second coordinate in the histogram image.

12. The method of claim 5, wherein every address in the image according to pairings of the first coordinate and a second coordinate is populated with a color value based on the HbA1c time series data as organized in the image.

13. A method, comprising:
    collecting HbA1c time series data of a patient across a plurality of days at a plurality of times for each day of the plurality of days;
    converting the HbA1c time series data into a binary image formatted to indicate a count of measurements in the HbA1c time series data that are organized by which day in the plurality of days the measurements in the HbA1c time series data were collected on as a first coordinate in the binary image and which range of a plurality of a ranges of values that a given measurement of the measurements in the HbA1c time series data are categorized into as a second coordinate in the binary image;

analyzing the binary image using a convolutional neural network;

predicting a predicted HbA1c level for the patient at a future time point at least one week in the future; and in response to the predicted HbA1c level for the patient being greater than a predefined threshold, prescribing a treatment plan for the patient of at least one of metformin administration and insulin administration before the future time point.

14. The method of claim 13, wherein the plurality of days consists of fourteen days of continuous blood glucose (CGM) measurements from the patient.

15. The method of claim 13, wherein the HbA1c time series data is collected at fifteen minute intervals from the patient.

* * * * *